US012782520B2

(12) United States Patent
Blasch

(10) Patent No.: US 12,782,520 B2
(45) Date of Patent: Nov. 3, 2026

(54) SURROUND-VIEW IMAGING SYSTEM

(71) Applicant: Jabil Optics Germany GmbH, Jena (DE)

(72) Inventor: Ian Blasch, Boise, ID (US)

(73) Assignee: Jabil Optics Germany GmbH, Jena (DE)

( * ) Notice: Subject to any disclaimer, the term of this patent is extended or adjusted under 35 U.S.C. 154(b) by 689 days.

(21) Appl. No.: 18/266,862

(22) PCT Filed: Dec. 14, 2020

(86) PCT No.: PCT/EP2020/086020
§ 371 (c)(1),
(2) Date: Jun. 13, 2023

(87) PCT Pub. No.: WO2022/128058
PCT Pub. Date: Jun. 23, 2022

(65) Prior Publication Data

US 2024/0053446 A1 Feb. 15, 2024

(51) Int. Cl.
*G01S 17/89* (2020.01)
*G01S 7/481* (2006.01)

(52) U.S. Cl.
CPC .......... *G01S 7/4816* (2013.01); *G01S 7/4815* (2013.01); *G01S 17/89* (2013.01)

(58) Field of Classification Search
CPC ..... A61B 1/041; A61B 1/0676; A61B 1/0669; A61B 1/0661; A61B 1/684; A61B 1/692;
(Continued)

(56) References Cited

U.S. PATENT DOCUMENTS 9,826,152 B1 11/2017 Martin et al.
2008/0247039 A1* 10/2008 Mizusawa .............. G02B 13/06 359/431

(Continued)

FOREIGN PATENT DOCUMENTS

CN 108345162 A 7/2018
EP 2413176 A1 2/2012

(Continued)

OTHER PUBLICATIONS

Office Action with English translation issued in corresponding CN Application No. 202080108399.9, dated Mar. 27, 2026.

*Primary Examiner* — Kenneth J Malkowski
(74) *Attorney, Agent, or Firm* — Young Basile Hanlon & MacFarlane, P.C.

(57) ABSTRACT

A surround-view imaging system for three dimensional imaging of a surrounding of the system includes integrated planar and radial illumination sources for an enhanced field of view (FOV). The system includes an imager and illuminator. The illuminator illuminates in a FOV of the illuminator the surrounding of the system such that illumination light reflected by the surrounding can be imaged by the imager in a FOV of the imager as imaging light. The illuminator comprises first illumination light sources to illuminate a first illumination region with first illumination light and second illumination light sources to illuminate a second illumination region of the illuminator FOV with second illumination light. The first illumination light and second illumination light reflected by the surrounding can be imaged by the imager as first imaging light in a first imaging region and as second imaging light in a second imaging region of the imager FOV, respectively.

8 Claims, 3 Drawing Sheets

(58) Field of Classification Search
CPC .... G02B 13/06; G02B 23/243; H04N 23/698; H04N 13/254; H04N 23/56; H04N 23/555; G06T 2207/10068
See application file for complete search history.

(56) References Cited

U.S. PATENT DOCUMENTS

| | | | | |
|---|---|---|---|---|
| 2010/0272318 | A1 * | 10/2010 | Cabiri | A61B 1/00009 600/109 |
| 2014/0228635 | A1 * | 8/2014 | Tuliakov | A61B 1/0684 600/117 |
| 2018/0373019 | A1 * | 12/2018 | Thursby | A61B 1/00188 |

FOREIGN PATENT DOCUMENTS

| | | | |
|---|---|---|---|
| GB | 2542865 | A | 4/2017 |
| WO | 2012056453 | A2 | 5/2012 |
| WO | 2014160983 | A2 | 10/2014 |
| WO | 2019068675 | A1 | 4/2019 |

* cited by examiner

SURROUND-VIEW IMAGING SYSTEM

TECHNICAL FIELD

The present invention refers to a surround-view imaging system for three-dimensional (3D) imaging of a surrounding of the system, comprising integrated planar and radial illumination sources for an enhanced field of view (FOV).

BACKGROUND

For 3D imaging systems or sensors which can depth image objects in a surrounding of the system, typically light/laser detection and ranging (LiDAR/LaDAR), time of flight (TOF, direct and indirect versions), amplitude or frequency modulated illumination, structured light, etc. are used. Such systems are found in autonomous mobile robots (AMRs), industrial mobile robots (IMRs), and automated guided vehicles (AGVs), lift trucks, forklifts, cars, drones, etc. to avoid collisions, to detect obstacles, for passenger monitoring and for observing keep-out-zones for machines and robots. These systems can also be used for collaborative robotics, security and surveillance camera applications.

A typical TOF depth sensing system consists of an illumination system including beam forming (e.g. electronic and/or optical beam forming in a temporal and/or spatial manner), an imaging system comprising receiving optics (e.g. a single lens or a complex lens system/objective) and an image detector for image detection, and an evaluation electronics for calculating the distances and maybe setting some alarms from the detected image signal. The illuminator typically sends out modulated or pulsed light. The distance of an object can be calculated from the time the emitted light requires for traveling from the illumination system to the object and back to the imaging system. Optical beam forming can be achieved by a beam shaping optics included in the illumination system. The beam shaping optics and the receiving optics can be separate optical elements (one-way optics) or the beam shaping optics and the receiving optics can use single, multiple or all components of the corresponding optics commonly (two-way optics).

When such an imaging solution based on wide-field lens optics is used in combination with a fixed array detector for image detection (e.g. CMOS, CCD, array of photodiodes, etc.), moving and therefore particularly error-prone scanner units can be avoided in the sensor. However, in such solutions the receiving lens, which focuses the surrounding onto the associated image detector, is a highly critical element. The lens must allow a high resolution over a wide field of view in the horizontal and the vertical direction. At the same time, it should show even imaging properties without vignetting and a high light throughput (small f-number) to achieve a long detection range.

A surround-view image can be produced by using a wide-angle lens (e.g. a fisheye lens or rectilinear lens) as the first lens in a lens system of an imaging system. Wide-angle lenses can have an angle of view (AOV), i.e. the maximum zenithal angle range for which a lens can provide an image, of more than 180°. Lenses with an AOV of more than 180° are also called ultra wide-angle lenses. Angles of view up to around 300° can be achieved. In a normal axially symmetric imaging system, the imageable azimuthal angle range is typically 360°, which allows surround-view in the azimuthal direction. Therefore, with an ultra wide-angle lens solid angles Q of up to around 3π steradian can be imaged. Wide-angle lenses typically show a strong curvilinear barrel distortion, which can to some degree optically corrected in rectilinear lenses. An optical barrel distortion correction can also be included in the design of an associated lens system. Lens systems with an angle of coverage larger than 180° are called ultra wide-angle lens systems.

Especially for AMR, IMR and AGV applications, an azimuthal angle range of 360° in the horizontal plane at high zenith angles in a range between 60° and 120° is required. For such purposes typically a fisheye lens can be used in the upright position. However, conventional fisheye lenses have several disadvantages, such as high angles of incidence and associated coating problems. Further problems are a wide field of view in combination with low resolution, low f-number and the relative illumination (vignetting-free).

These limitations can be avoided by using a catadioptric lens system in which mirrors and lenses are combined to form the image. A catadioptric lens system can be optimized for specific FOV ranges while other zenithal angle ranges may be neglected or blanked. However, there are several other optical solutions available which can be designed and optimized for specific zenithal angle ranges, e.g. for specifically imaging FOV starting at zenithal angles larger than 60° and reaching to zenithal angles larger than 120°. By such a limitation of the imageable or practically imaged FOV, one or more regions of interest (ROIs) can be optically defined by the lens system, which allows to improve the optical imaging properties for said regions. Furthermore, incorrect depth signals caused from illumination light that is multi-reflected by the surrounding or image detector saturation can be also avoided.

Said FOV limited imaging systems can be quite acceptable in applications where imaging the surrounding in regions with low zenithal angles are not of interest. This may be the case for AMRs or IMRs where the image sensor is installed in upright position and only the horizontal 3D surrounding is required to be imaged or monitored. The region directly above the sensor may irrelevant in most cases and can be neglected in imaging. Thus, such implementations inherently create a blind spot in the vertical direction of an orbital sensor and limit the data available for AI, machine learning/deep learning and other evaluation algorithms. However, in some applications it may still be useful to have at least some information also from such neglected regions; even though the image quality may be reduced compared to the FOV ranges in imaging systems which are optimized for imaging regions with high zenithal angles.

Optimized fisheye-type lenses (e.g. a catadioptric lens system) with wide horizontal but zenithal angle range limited FOV are typically imaging the surrounding onto a circular ring in the image plane of the imaging system. A two-dimensional array detector (e.g. CMOS, CCD, array of photodiodes, etc.) which can fully cover the circular image ring can be used to detect the image of the surrounding. But also for standard fisheye-lenses and other lenses without an optimized FOV region, the readout of the image detector can be limited to specific zenithal or azimuthal angle ranges and in particular as well to a circular ring comparable to a circular image region of said optimized fisheye-type lenses. With such a spatially limited detection, incorrect depth signals caused from multi-reflected illumination light or image detector saturation can be avoided similar to an optical limitation. In contrast to such optically defined ROIs, these configurations are typically referred to as image detector defined ROIs. However, in both arrangements the central pixels of the associated image detector are not used for collecting related imaging data. Instead the use of an FOV optimized lens or an image detector with a selected readout typically limit data collection to a region of pixels at or near the periphery of a 2D image detector. Thus, depending on the type of imaging system, either a region of the active surface of the image detector (or a substantial region of the image plane if the detector surface is already adapted to an optically defined ROI) is unused and therefore neglected from imaging.

The objective problem of the invention is thus related to the problem of allowing to increase the FOV of an angle range limited surround-view imaging system having a fisheye-type (or wide angle, ultra-wide angle, panamorph, etc.) lens optimized for imaging high zenithal angle ranges to include also at least partly low non-optimized zenithal angle ranges without reducing the imaging properties in the optimized FOV ranges. Therefore, a surround-view imaging system optimized for high zenithal angle ranges (e.g. starting at zenithal angles larger than 60°) shall be provided in which the low zenithal angles (e.g. for zenithal angles smaller than 60°), e.g. in a region directly above an imaging system with a fisheye-type lens in an upright position, can also be imaged or monitored.

SUMMARY

The invention solves the objective problem by providing a surround-view imaging system as defined in claim 1.

The surround-view imaging system for imaging a surrounding of the system comprises an imager and an illuminator; wherein the illuminator is adapted to illuminate in a field of view of the illuminator the surrounding of the system such that illumination light that is reflected by the surrounding can be imaged by the imager in a field of view of the imager as imaging light; wherein the illuminator comprises a set of first illumination light sources adapted to illuminate a first illumination region of the field of view of the illuminator with first illumination light and a second set of illumination light sources adapted to illuminate a second illumination region of the field of view of the illuminator with second illumination light, wherein first illumination light and second illumination light that is reflected by the surrounding can be imaged by the imager as first imaging light in a first imaging region and as second imaging light in a second imaging region of the field of view of the imager, respectively.

An imager is to be understood as a device which is able to receive, focus and detect imaging light entering the imager from a surrounding of the imager. It therefore typically comprises at least an (preferably ring-shaped circumferential 360 degrees) entrance aperture adjacent to the surrounding, a lens or other optical element to generate an image of the surrounding and an associated image detector to detect the generated image of the surrounding for further processing. Since the generation of the image is the far most critical aspect for ensuring a good image quality, instead of using a single lens or optical element, complex lens systems (or optical component systems in general) for the correction of occurring aberrations may be used in an imager. An imager can be a device which uses ambient light for imaging (e.g. 3D visible or infrared light) or is specifically adapted to image reflected light from an illumination light source (illumination light) as imaging light (e.g. flash LIDAR).

Preferably, an imager including a lens system (or a single lens) is further adapted to image around the optical axis of the lens system (axially symmetric imaging) in an image on an image plane perpendicular to the optical axis of the lens system (perpendicular imaging). However, some components of the lens system may also be arranged off-axial or the image plane could be shifted and/or tilted with respect to the optical axis of the optical system. Such embodiments allow an increased flexibility for matching the FOV of the imaging system to a specific ROI especially in TOF depth sensing applications.

In a preferred embodiment, the image detector may have an active detection region which is adapted to the image size. As the central region of the image, which can correspond to zenithal angles outside the effective FOV of the imager, may not be relevant for imaging, these regions of the image detector can be completely omitted or neglected from image readout or by a selective mapping with an effective active detector surface. This has the advantage that otherwise passive regions of the image detector cannot be saturated by accidentally captured ambient and scattered light. Furthermore, due to the fact that no readout of insignificant detector regions has to be performed, the effective frame rates of a specific type of detector can be increased at some detector designs. Through higher frame rates, the accumulation of optically induced charge carriers in the individual pixels of a detector can be reduced such that the signal-to-noise ratio (SNR) of the detector can be optimized for image detection over a wide dynamic range without using high dynamic range (HDR) techniques.

An illuminator is to be understood as a device which is able to emit illumination light in a surrounding of the illuminator. In a surround-view imaging system, an illuminator may provide a bright light impulse, which is reflected by objects in the surrounding and which then can be imaged as imaging light by an imager (e.g. flash LIDAR) having an associated image detector. However, an illuminator can also be configured to provide a temporally and/or spectrally well-defined light field which also interacts with objects in the surrounding of the illuminator to be reflected and which can be imaged afterwards (e.g. standard LiDAR/LaDAR or TOF). The term illuminator is therefore not restricted to a specific type of light source or a specific type of illumination for the surrounding. The discussed types of surround view imaging systems are usually referred to as active imaging systems. In contrast, passive surround-view imaging systems are designed to use only ambient light for imaging and therefore they do not require an illuminator as an essential component.

The FOV of the illuminator and the FOV of the imager must at least partly overlap to allow the reflected illumination light to be received as imaging light. However, to avoid saturation and overexposure of an associated image detector, the two FOVs can be adapted to differ from one another or to include different FOV regions. An illuminator according to the invention comprises a set of first illumination light sources adapted to illuminate a first illumination region of the field of view of the illuminator with first illumination light and a second set of illumination light sources adapted to illuminate a second illumination region of the field of view of the illuminator with second illumination light. The light sources can be, for example, laser diodes (LD, VCSELs), light emitting diodes (LEDs), solid state lasers, or individual optical free-space couplers from a corresponding laser or light distribution system. That means, the set of first illumination light sources can be adapted to illuminate a first zenithal angle range in the FOV of the illuminator while the set of second illumination light sources can be adapted to illuminate a second zenithal angle range in the FOV of the illuminator.

A set shall include at least one light source. It is also obvious that the terms first and second set of illumination light sources should not be limited to different light sources per se. For example, a single solid state laser may provide laser light to different free space couplers by a laser distribution system (e.g. based on optical fibers) defining independent illumination light sources. Another example may a single light source emitting in a wide FOV in combined with a spatial light modulator (SLM) defining independently controllable first and second illumination regions for the light from said single light source. The single light source in combination with the SLM thus as well defines a first illumination light source and a second illumination light source although their emitted light is initially provided by a single light source.

In other words, the sets should not be defined by sets of individual light sources per se but virtually in view of their resulting illumination regions. With the ability to control the spatial intensity profile of the emission of individual light sources (e.g. VCSELs or LEDs), each of the individual light sources may be considered to belong to a first and a second set of illumination light sources depending on the respective illumination region of the field of view of the illuminator to which the different spatial intensity profiles belong. Controlling the spatial intensity profile of individual light sources is thus considered equivalent to using an SLM in conjunction with a common light source providing light for illuminating different first and second illumination regions.

It should also be clear that a surround-view imaging system according to the invention can have more than two illumination or imaging regions, respectively. Depending on the specific applications, three, four or five separate regions of the surrounding may be imaged by, for example, having a corresponding number of sets of illumination light sources. The different illumination or imaging regions are preferably separated, however, in other embodiments they could also be partly overlap at least for some of said multiple regions. A partial overlap may be useful for stitching separate depth images acquired sequentially from neighboring regions.

According to the requirement that the FOV of the illuminator and the FOV of the imager must at least partly overlap for imaging, the first illumination light in the first illumination region and second illumination light in the second illumination region that may both be reflected by the surrounding can be imaged by the imager as first imaging light in a first imaging region and as second imaging light in a second imaging region of the field of view of the imager, respectively. This means, the set of first illumination light sources can be adapted to illuminate a first zenithal angle range in the FOV of the imager while the set of second illumination light sources can be adapted to illuminate a second zenithal angle range in the FOV of the imager. Preferably, the first illumination region fully overlaps with the first imaging region. Preferably, the second illumination region fully overlaps with the second imaging region.

It is therefore an idea of the invention to provide a surround-view imaging system which may be optimized for high zenithal angle ranges (e.g. starting at zenithal angles larger than 60°) in which the lower zenithal angles (e.g. for zenithal angles smaller than 60°), e.g. a region directly above an image sensor with a fisheye-type lens in an upright position, can also be imaged or monitored. For this purpose, two sets of illumination light sources are used to illuminate two at least partly different illumination regions. The received imaging light can then be focused and detected by an imager comprising a fisheye-type lens which is able to image the surrounding to a planar image detector as circular or otherwise shaped image of two imaging regions which were before differently illuminated by the illuminator.

In particular, the invention thus provides a solution for collecting depth data from pixels located at or near the center region of the image detector. In the sensor both radial and planar (or dome) illumination and sensor control algorithms can be combined to create a broader coverage volume. The applied radial illumination and imaging combination can capture depth information in a radial pattern, and the planar illumination and imaging combination can capture depth information in a vertical direction (e.g. orthogonal to an XY plane of an associated image detector) from the imaging system. The invention can be used in any AMR, IMR or AGV in, for example, factories, in material handling facilities or security facilities. For the planar illumination, one or more VCSELs can be used as illumination light sources to illuminate a scene in the surrounding. Algorithms can be used for collision avoidance, navigation, object identification, etc. after image detection. Adding planar volumetric sensor data further increases the amount of data available to the AI and machine learning/deep learning algorithms.

Preferably, the first illumination region and the second illumination region are distinct from one another. In other embodiments the first illumination region and the second illumination region partly overlap. Distinct illumination regions are advantageous because the imaging of the first imaging region and second imaging region, which both may require a previous illumination, can be separated from one another without mutual interferences. In particular, such an optical separation allows to change the illumination power or the rate of illumination for one imaging region independent from the imaging properties in the other imaging region.

Preferably, the imager comprises a fisheye-type lens having a continuous field of view including the first imaging region and the second imaging region. Such imagers are simple to design and a continuous field of view allows to freely modify the edges of the different imaging regions by adapting the zenithal angle ranges. However, imagers may also be designed to provide optical transmission only for a specific first imaging region and a specific second imaging region which do not have to adjoin each other. Such embodiments may be advantageous in cases where any mutual interferences should be safely excluded.

Preferably, the first imaging region is related to high zenithal angle regions and the second imaging region is related to low zenithal angle regions. The terms high and low describe relative relations between the different regions. However, in some embodiments the second imaging region may be located inside the first imaging region (the corresponding first illumination sources may thus emit illumination light in two different first illumination regions having a dark region in between). Relating the first imaging region and the second imaging region to distinct continuous zenithal angle regions has the advantage that the regions may be adapted to different image quality requirements. In particular, a lens system designed and optimized for imaging higher zenithal angle ranges can be used for radial imaging the surrounding with a 360° azimuthal angle range while for the lower zenithal angle ranges the optical quality may be reduced for simple monitoring only. For example, when using an imaging system in an upright position in an AMR or IMR, an azimuthal angle range of 360° may be observed with high optical quality by illuminating with radial illumination in the first illumination region. Furthermore, the surrounding located above the imaging system may be observed with lower optical quality by illuminating with planar illumination in the second illumination region in the upward direction.

Preferably, the illumination of the first illumination region and the second illumination region is performed simultaneously, wherein the first illumination light and the second illumination light are intrinsically separable. A simultaneous illumination and imaging allows high framerates for both regions. However, mutual interferences may occur between the different imaging regions. Various methods can be applied to allow an intrinsically separation between first illumination light and the second illumination light. Modulation schemes can be applied to impose specific characteristics to the illumination light. When using modulation schemes, however, a complex analysis of the signals from the image detector for separation may be necessary. Another method is to use polarization schemes to allow a separation of light. For example, linearly or elliptical polarized light with different polarization parameters may be used for the first illumination light and the second illumination light. A separation can then be performed by using corresponding polarization filters in front of an associated image detector.

Preferably, the illumination of the first illumination region and the second illumination region is performed sequentially so that the first imaging light and the second imaging light are temporally separable. If operated sequentially, the radial and planar illumination sources can be interleaved frame-to-frame in different patterns. In some embodiments, the regions for illumination and imaging are strictly alternated from frame to frame or between equally long frame sets. In other embodiments, the regions for illumination and imaging may be switch in a sequential order with differently long frame sets. For example, in a TOF sensor five frames of radial volumetric depth information may be captured with radial illumination before another five frames of planar volumetric depth information are captured with planar illumination. In another exemplarily embodiment, after ten frames with radial illumination and imaging, a planar illumination and imaging may be performed for a reduced time interval of two frames. An asymmetric sequential illumination and imaging scheme allows to increase the frame rates for the one imaging regions compared to the other imaging region. This may be used to allow a compensation for optical aberrations within the imager by post-processing the images or to further enhance the imaging properties in critical imaging regions. Preferably, the first illumination light and the second illumination light are further intrinsically separable, for example, by additionally applying modulation techniques. This has the advantage that even highly scattered/delayed illumination light from one region cannot interfere with the illumination and imaging of the other region.

Preferably, the first set of illumination light sources and the second set of second illumination light sources are circumferentially arranged, and at least some of the illumination light sources electrically and mechanically connected to a related illumination board by a pivoting or moving bracket or holder.

The idea of this embodiment is that the individual light sources (or any related light shaping/directing devices) can be mounted to a pivoting or moving bracket or holder on the illumination board. This allows to mechanically control the angle or position of the light sources and the light shaping/directing devices in order to achieve a required light distribution in the respective FOV. This can, for example, be done dynamically depending on an actual FOV requirement. The illumination light sources can thus be controlled in their emission direction.

A preferred embodiment for such a mechanically controllable light source alignment is a rigid-flex illumination board, where the light sources are attached by flexible cables that can be rotated or translated into position, either during a production process of the illumination board or later in real-time during use of the imaging system.

For optimizing the positioning of the radial illumination, the illumination sources (e.g. VCSELs, LEDs) may be placed on rigid flex boards. The rigid flex circuits allow for the VCSELs (or any other illumination light sources) to be rotated into the desired position to optimize scene illumination and crossover with the lens solution of the imager. There are three key advantages to this design approach. First, the use of flex circuits increases the flexibility of design during the product design phase. If changes occur to the imaging lens, distance between imaging lens and illumination VCSEL, or crossover region during the design and manufacturing process, the illumination light sources can be rotated into the desired position and angle. Second, the rigid flex illumination board can be used in multiple sensor designs. The flex circuits can thus be adjusted to meet multiple geometric designs. Finally, the use of rigid flex supports the use of real-time mechanical adjustment of the VCSEL positioning. Integrating the flex circuit with motors, actuators, or other elements can be used to rotate the VCSEL direction between 0° and 90°, as well as change the XYZ positioning. The use of rigid flex circuits can be used to create an integrated solution where all or a subset of the illumination light sources are rotated (pitch, yaw, roll) or translated (x, y, z) into positions in real-time based on scene information. In some cases, the illumination light sources may start in a planar position and subsequently rotate into a radial position or vice versa based on the desired application, environment, target characteristics, platform mounting, etc.

Preferably, an angle between the individual illumination light sources of a set of illumination light sources and a corresponding illumination board is actively controlled by actuators. The actuators can be controlled by an illumination controller. The angle can be dynamically changed and the FOV of the illuminator can be adapted in use. This has the advantage that the individual illumination light sources can be mechanically intensity controlled with respect to a specific illumination direction.

Preferably, the first set of illumination light sources and the second set of second illumination light sources are arranged one over another. With such an arrangement the illumination light can be spatially separated and a potential scattering of light between both regions can be avoided. Since the illumination power density decreases with the distance square from the source of the illumination, the power density near the source is very high. If the first illumination light sources and the second illumination light sources are not separated by a certain distance and there is an object close to the sensor (e.g. wall or box), than light can easily scattered from one region to the other which may cause mutual interference.

The real-time control of the radial and planar illumination can be performed by either processing available to the sensor (FPGA, ASIC, SOC) or a host processor based on real-time scene feedback. Depth data output from the ASIC (FPGA or logic integrated in the TOF depth sensor) can be sent to the sensor processing or host processor. The host processor could be integrated with the sensor or connected to the sensor by wireless, ethernet, USB or other protocol. Control algorithms for the illumination of the imaging sensor, can provide control feedback to translate or rotate the individual illumination light sources. Translation and rotation of the illumination light sources on rigid flex circuits can be accomplished using motors, pneumatics, fluidics, magnetics, shape memory alloys, or other motion generating solution.

Further preferred embodiments of the invention result from features mentioned in the dependent claims.

The various embodiments and aspects of the invention mentioned in this application can be combined with each other to advantage, unless otherwise specified in the particular case.

BRIEF DESCRIPTION OF THE DRAWINGS

In the following, the invention will be described in further detail by figures. The examples given are adapted to describe the invention. The figures show.

DETAILED DESCRIPTION

Figure 1:
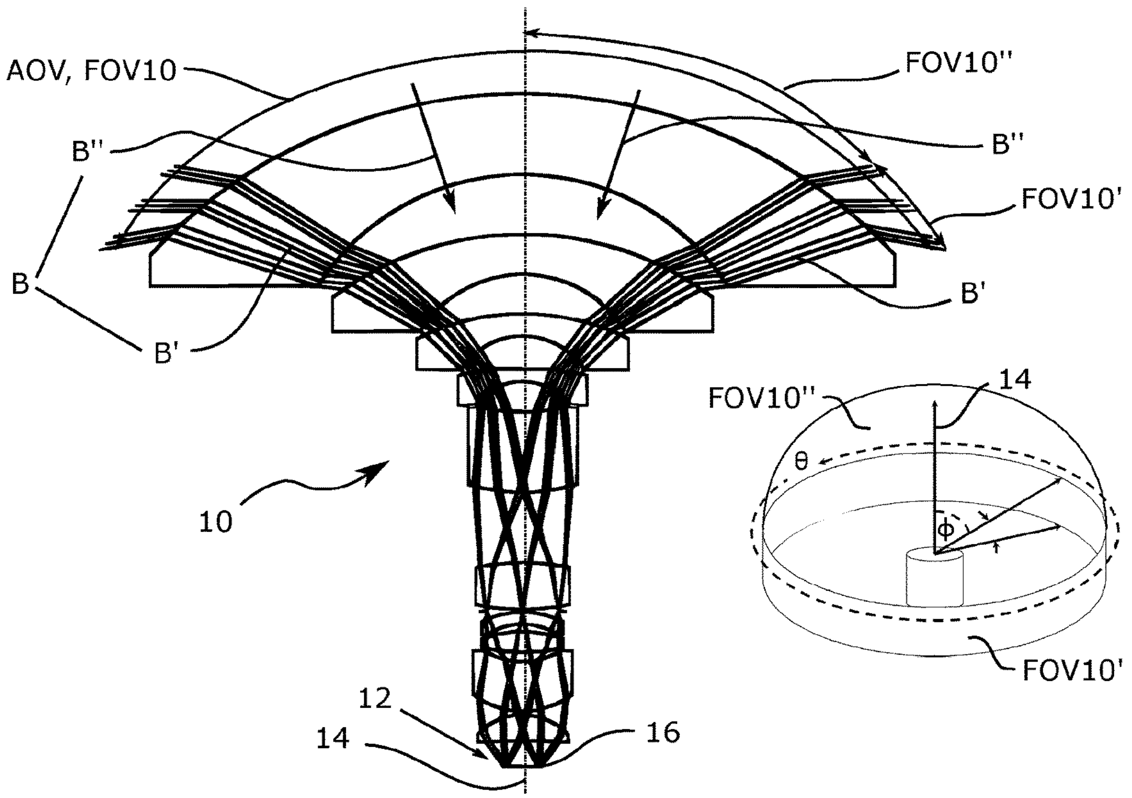
FIG. 1 a schematic illustration of an exemplarily embodiment of an imager according to the invention.

FIG. 1 shows a schematic illustration of an exemplarily embodiment of an imager 10 according to the invention. The calculated ray paths inside the optical system of the imager 10 for first imaging light B' which is received from the first imaging region FOV10' are shown. Further shown is the direction of travel inside the optical system of the imager 10 for second imaging light B" which is received from the second imaging region FOV10". The first imaging light B' and second imaging light B' together are the imaging light B. The imager 10 comprises a lens stack with multiple fisheye-type lenses forming a continuous field of view FOV10 including the first imaging region FOV10' and the distinct second imaging region FOV10". The first imaging region FOV10' is related to high zenithal angles φ larger than 60° and the second imaging region FOV10" is related to low zenithal angles φ smaller than 60°. In the inset of the figure, the definition of the zenithal angles φ and azimuthal angles θ with respect to the optical axis 14 of the imager 10 is illustrated.

The shown lens system 10 is fully refractive and may consist of 10 glass lenses. However, the number of lenses and the material type can be replaced with other quantities and materials. In particular, the shown lens system is designed for a zenithal first imaging region FOV10' of 20° starting at a zenithal angle φ of 80°. All received optical beams are focused so that an image 16 of the surroundings is imaged on a common image or detector plane 12, which can be aligned perpendicular to the optical axis 14 of the imager 10.

Figure 2:
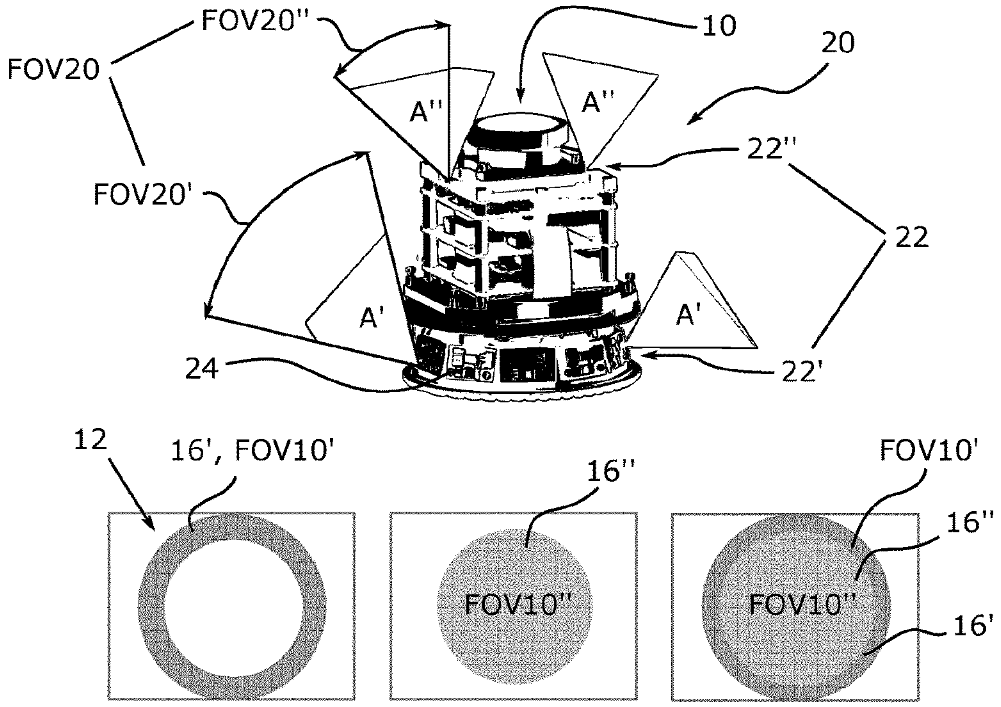
FIG. 2 a schematic illustration of an exemplarily embodiment of a surround-view imaging system according to the invention.

FIG. 2 shows a schematic illustration of an exemplarily embodiment of a surround-view imaging system according to the invention. An imager 10 according to the embodiment shown in FIG. 1 or any other imager 10 compatible with the invention may be included. The shown surround-view imaging system for imaging a surrounding of the system thus comprises an imager 10 and an illuminator 20; wherein the illuminator 20 is adapted to illuminate in a field of view of the illuminator FOV20 the surrounding of the system such that illumination light A that is reflected by the surrounding can be imaged by the imager 10 in a field of view of the imager FOV10 as imaging light B; wherein the illuminator 20 comprises a set of first illumination light sources 22' adapted to illuminate a first illumination region FOV20' of the field of view of the illuminator FOV20 with first illumination light A' and a second set of illumination light sources 22" adapted to illuminate a second illumination region FOV20" of the field of view of the illuminator FOV20 with second illumination light A", wherein first illumination light A' and second illumination light A" that is reflected by the surrounding can be imaged by the imager 10 as first imaging light B' in a first imaging region FOV10' and as second imaging light B" in a second imaging region FOV10" of the field of view of the imager FOV10, respectively.

The first illumination region FOV20' and the second illumination region FOV20" can be distinct from one another. In the shown embodiment, however, the first illumination region FOV20' and the second illumination region FOV20" are partly overlapping. The imager 10 may comprise a fisheye-type lens having a continuous field of view FOV10 including the first imaging region FOV10' and the second imaging region FOV10". However, the first imaging region FOV10' and the second imaging region FOV10" could also be distinct regions of a non-continuous field of view FOV10 or may be interleaved regions. The first imaging region FOV10' is related to high zenithal angles φ and the second imaging region FOV10" is related to low zenithal angles cp.

In the bottom of the figure, the corresponding image generation in the image or detector plane 12 of a surround-view imaging system according to the invention is shown. While in the left illustration the first imaging region FOV' is imaged as a circular image 16, the central part of the image or detector plane 12 is typically neglected. As the illustration in the middle shows, this part may have a circular shape. It may directly correspond to a second imaging region FOV". In a surround-view imaging system according to the invention, both parts can be used for image generation and detection. First imaging light B' from the first imaging region FOV' and second imaging light B" from the second imaging region FOV" can both projected to form an image 16 of the surrounding in the image or detector plane 12. The image 16 projected on the image detector is circular in this illustration but could be smaller, larger or take a different shape depending on the illumination and lens design of the imager 10. Further, the image detector readout can be limited to ROIs specifically restricting the volume of the surrounding which can be imaged. When a planar illumination capture and the radial illumination capture are combined, continuous senor coverage of the surrounding can be realized.

Figure 3A:
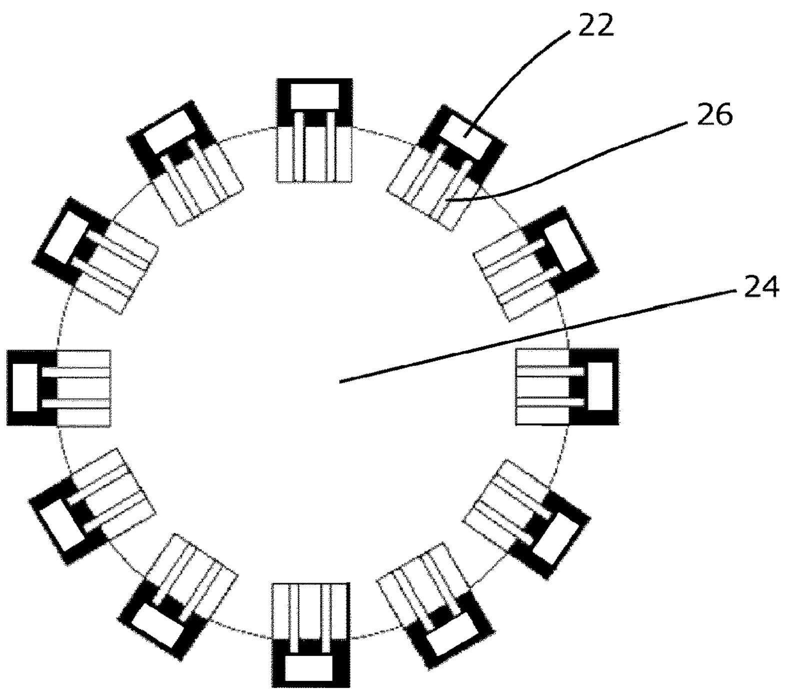
FIG. 3 schematic illustrations of exemplarily illuminators allowing a control of the illumination direction.
Figure 3B:
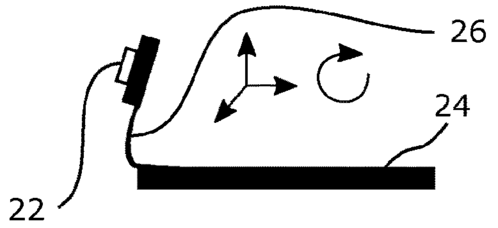
Figure 3C:
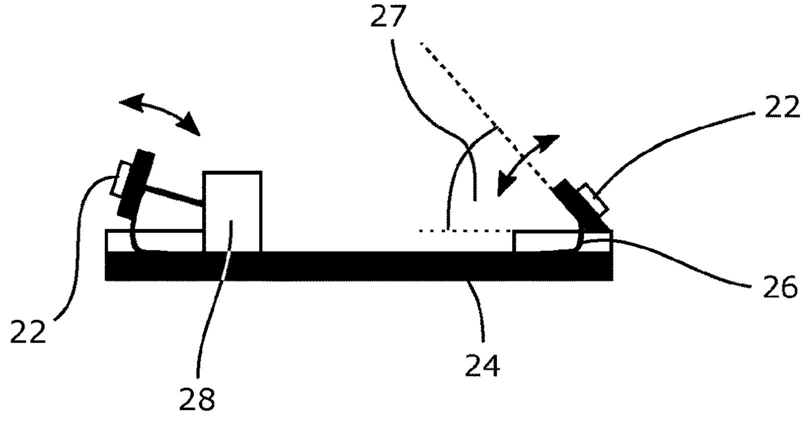

FIG. 3 shows schematic illustrations of exemplarily illuminators 20 allowing a control of the illumination direction. The figures may apply to both, the first set of illumination light sources 22' and the second set of illumination light sources 22". For simplicity, only one illuminator 20 will be referred to below. The shown illuminator 20 comprises circumferentially arranged illumination light sources 22, wherein the illumination light sources 22 are electrically and mechanically connected to a related illumination board 24 by a pivoting or moving bracket or holder 25. This allows to mechanically control the angle or position of the illumination light sources 22 and light shaping/directing devices in order to achieve a required light distribution in the respective imaging region FOV20', FOV20". This can be done dynamically depending on an actual field of view requirement. Preferably, an angle 27 between the illumination light sources 22 and the illumination board 24 is actively controlled by actuators 28.

An option for mounting illumination light sources 22 with variable positions is the shown rigid-flex illumination board 24, where the illumination light sources 22 (e.g. VCSELs) are attached by flexible circuits that can be rotated or translated into position, either during the production process or in real-time during use. In particular, the figure shows individual VCSELs as illumination light sources 22 attached to the illumination board 24 by flexible cables 26. The flexible cables 26 allow the VCSELs to be rotated or translated to adapt to a required FOV. The rotation of the VCSEL can be done dynamically or during production and thereby set at a fixed angle.

Figure 4A:
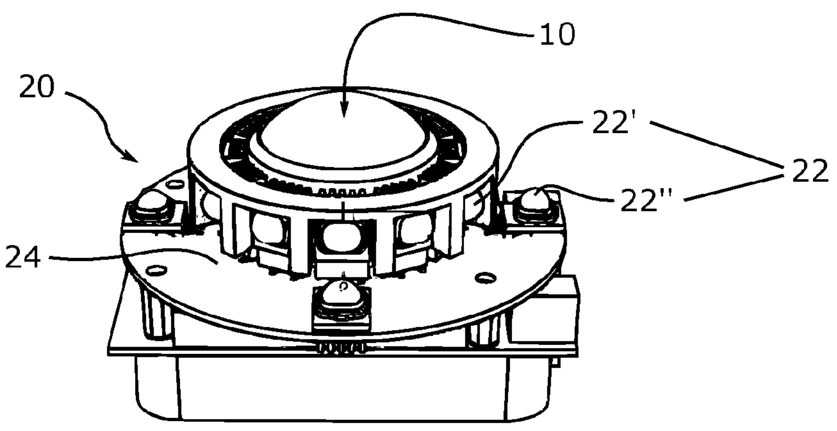
FIG. 4 a schematic illustration of another exemplarily embodiment of a surround-view imaging system according to the invention.
Figure 4B:
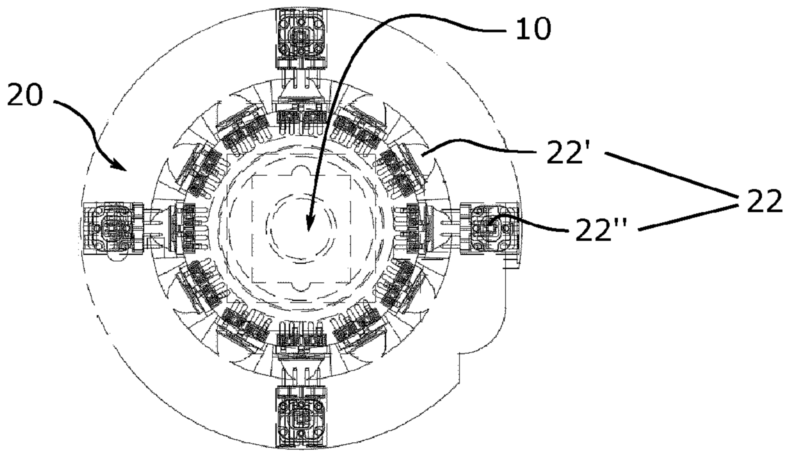

FIG. 4 shows a schematic illustration of another exemplarily embodiment of a surround-view imaging system according to the invention. In particular, FIG. 4*a* shows a perspective view from the side, while FIG. 4*b* is a top view. The embodiment includes a first set of illumination light sources 22' comprising 12 LEDs positioned radially for radial illumination and a second set of second illumination light sources 22" comprising 4 LEDs pointed vertically for planar illumination. Both sets are circumferentially arranged around a central imaging section including an outer fisheye-type lens 10 pointing in the upwards direction. Each of the illumination sources 22 is electrically and mechanically connected to a related illumination board 24. The first set of illumination light sources 22' may be connected to related illumination board 24 by a pivoting or moving bracket or holder. However, the illumination directions of the first set of illumination light sources 22' and/or the second set of illumination light sources 22" (i.e. FOV20' and FOV20") can also be fixed. The number of illumination light sources 22 can also be lower or higher than shown here.

In general, a surround-view imaging system for imaging a surrounding of the system includes an imager and an illuminator, wherein the illuminator is adapted to illuminate in a field of view of the illuminator the surrounding of the system such that illumination light that is reflected by the surrounding can be imaged by the imager in a field of view of the imager as imaging light; wherein the illuminator comprises a set of first illumination light sources adapted to illuminate a first illumination region of the field of view of the illuminator with first illumination light and a second set of illumination light sources adapted to illuminate a second illumination region of the field of view of the illuminator with second illumination light, wherein first illumination light and second illumination light that is reflected by the surrounding can be imaged by the imager as first imaging light in a first imaging region and as second imaging light in a second imaging region of the field of view of the imager, respectively; wherein the illumination of the first illumination region and the second illumination region is performed simultaneously, wherein the first illumination light and the second illumination light are intrinsically separable; and wherein the intrinsic separation between the first illumination light and the second illumination light is achieved based on modulation or polarization discrimination.

In implementations, the first illumination region and the second illumination region are distinct from one another or at least partly overlap. In implementations, the imager comprises a fisheye-type lens having a continuous field of view including the first imaging region and the second imaging region. In implementations, the first imaging region is related to a central region of the fisheye-type lens and the second imaging region is related to edge regions of the fisheye-type lens. In implementations, the first set of illumination light sources and the second set of second illumination light sources are circumferentially arranged, and at least some of the illumination sources electrically and mechanically connected to an related illumination board by a pivoting bracket, moving bracket or holder. In implementations, an angle between the individual illumination light sources of a set of illumination light sources and a corresponding illumination board is actively controlled by actuators. In implementations, wherein the first set of illumination light sources and the second set of second illumination light sources are arranged one over another.

In general, a surround-view imaging system for imaging a surrounding of the system includes an imager and an illuminator, wherein the illuminator is adapted to illuminate in a field of view of the illuminator the surrounding of the system such that illumination light that is reflected by the surrounding can be imaged by the imager in a field of view of the imager as imaging light, wherein the illuminator comprises a set of first illumination light sources adapted to illuminate a first illumination region of the field of view of the illuminator with first illumination light and a second set of illumination light sources adapted to illuminate a second illumination region of the field of view of the illuminator with second illumination light, wherein first illumination light and second illumination light that is reflected by the surrounding can be imaged by the imager as first imaging light in a first imaging region and as second imaging light in a second imaging region of the field of view of the imager, respectively, wherein the illumination of the first illumination region and the second illumination region is performed sequentially so that the first imaging light and the second imaging light are temporally separable, wherein the first illumination light and the second illumination light are intrinsically separable, and wherein the intrinsic separation between the first illumination light and the second illumination light is achieved based on modulation or polarization discrimination.

REFERENCE LIST

10 imager
12 image detector/plane
14 optical axis
16 image
20 illuminator
22 illumination light source
22' first set of illumination light sources
22" second set of illumination light sources
24 illumination board
26 flexible cables
27 angle
28 actuators
θ azimuthal angle
φ zenithal angle
A', A" first and second illumination light
B', B" first and second imaging light
AOV, FOV angle and field of view
FOV10 field of view of the imager
FOV10', FOV10" first and second imaging region
FOV20 field of view of the illuminator
FOV20', FOV20" first and second illumination region

The invention claimed is:

1. A surround-view imaging system for imaging a surrounding of the system, comprising:

an imager and an illuminator;

wherein the illuminator is adapted to illuminate in a field of view of the illuminator the surrounding of the system such that illumination light that is reflected by the surrounding can be imaged by the imager in a field of view of the imager as imaging light;

wherein the illuminator comprises a set of first illumination light sources adapted to illuminate a first illumination region of the field of view of the illuminator with first illumination light and a second set of illumination light sources adapted to illuminate a second illumination region of the field of view of the illuminator with second illumination light, wherein first illumination light and second illumination light that is reflected by the surrounding can be imaged by the imager as first imaging light in a first imaging region and as second imaging light in a second imaging region of the field of view of the imager, respectively;

wherein the illumination of the first illumination region and the second illumination region is performed simultaneously, wherein the first illumination light and the second illumination light are intrinsically separable; and wherein the intrinsic separation between the first illumination light and the second illumination light is achieved based on modulation or polarization discrimination.

2. The surround-view imaging system according to claim 1, wherein the first illumination region and the second illumination region are distinct from one another or at least partly overlap.

3. The surround-view imaging system according to claim 1, wherein the imager comprises a fisheye-type lens having a continuous field of view including the first imaging region and the second imaging region.

4. The surround-view imaging system according to claim 3, wherein the first imaging region is related to a central region of the fisheye-type lens and the second imaging region is related to edge regions of the fisheye-type lens.

5. The surround-view imaging system according to claim 1, wherein the first set of illumination light sources and the second set of second illumination light sources are circumferentially arranged, and at least some of the illumination sources electrically and mechanically connected to an related illumination board by a pivoting bracket, moving bracket or holder.

6. The surround-view imaging system according to claim 1, wherein an angle between individual illumination light sources of a set of illumination light sources and a corresponding illumination board is actively controlled by actuators.

7. The surround-view imaging system according to claim 1, wherein the first set of illumination light sources and the second set of second illumination light sources are arranged one over another.

8. A surround-view imaging system for imaging a surrounding of the system, comprising:

an imager and an illuminator;

wherein the illuminator is adapted to illuminate in a field of view of the illuminator the surrounding of the system such that illumination light that is reflected by the surrounding can be imaged by the imager in a field of view of the imager as imaging light;

wherein the illuminator comprises a set of first illumination light sources adapted to illuminate a first illumination region of the field of view of the illuminator with first illumination light and a second set of illumination light sources adapted to illuminate a second illumination region of the field of view of the illuminator with second illumination light, wherein first illumination light and second illumination light that is reflected by the surrounding can be imaged by the imager as first imaging light in a first imaging region and as second imaging light in a second imaging region of the field of view of the imager, respectively;

wherein the illumination of the first illumination region and the second illumination region is performed sequentially so that the first imaging light and the second imaging light are temporally separable, wherein the first illumination light and the second illumination light are intrinsically separable; and wherein the intrinsic separation between the first illumination light and the second illumination light is achieved based on modulation or polarization discrimination.

* * * * *